(12) United States Patent
Heim et al.

(10) Patent No.: US 8,760,808 B2
(45) Date of Patent: Jun. 24, 2014

(54) MAGNETIC DEVICE CONTAINING A HEATER

(75) Inventors: Kevin Richard Heim, Eden Prairie, MN (US); Erik J. Hutchinson, Eden Prairie, MN (US); Steve A. Mastain, Chanhassen, MN (US); Jay A. Loven, Bloomington, MN (US); Anthony M. Mack, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 404 days.

(21) Appl. No.: 12/769,722

(22) Filed: Apr. 29, 2010

(65) Prior Publication Data

US 2011/0267715 A1    Nov. 3, 2011

(51) Int. Cl.
*G11B 5/17*    (2006.01)

(52) U.S. Cl.
USPC .................................. 360/125.31

(58) Field of Classification Search
USPC ......... 360/123.06, 125.31, 125.32; D8/38, 34
See application file for complete search history.

(56) References Cited

U.S. PATENT DOCUMENTS

| | | | | |
|---|---|---|---|---|
| D33,634 S | * | 12/1900 | Lord, Jr. | D3/210 |
| D79,877 S | * | 11/1929 | Avillar | D8/38 |
| D87,212 S | * | 6/1932 | Halvorsen | D8/38 |
| D91,853 S | * | 3/1934 | Wilkins | D8/38 |
| D117,768 S | * | 11/1939 | Casebeer | D8/38 |
| D123,405 S | * | 11/1940 | Labich | D8/38 |
| D123,406 S | * | 11/1940 | Labich | D8/38 |
| D127,727 S | * | 6/1941 | Pietrzyk | D3/210 |
| D154,880 S | * | 8/1949 | Ross | D8/38 |
| 2,641,943 A | * | 6/1953 | Krize, Jr. | 81/3.4 |
| D175,013 S | * | 6/1955 | Brocken | D8/34 |
| D177,710 S | * | 5/1956 | Bird | D8/34 |
| D183,767 S | * | 10/1958 | Reibling | D11/83 |
| D238,244 S | * | 12/1975 | Pasquale | D8/18 |
| D281,946 S | * | 12/1985 | Youhanaie | D8/38 |
| D313,732 S | * | 1/1991 | Adcock | D8/38 |
| 5,077,850 A | * | 1/1992 | Brubaker | 7/151 |
| 5,267,494 A | * | 12/1993 | Waluda | 81/3.09 |
| D352,878 S | * | 11/1994 | Penrose | D8/38 |
| D382,784 S | * | 8/1997 | Kagiyama et al. | D8/40 |
| D406,506 S | * | 3/1999 | Wysopal | D8/38 |
| D410,368 S | * | 6/1999 | Wysopal | D8/38 |
| D429,452 S | * | 8/2000 | Koefelda | D8/38 |
| D429,612 S | * | 8/2000 | Hames | D8/38 |
| D433,898 S | * | 11/2000 | Hunt | D8/38 |
| D433,900 S | * | 11/2000 | Wysopal | D8/38 |
| D435,412 S | * | 12/2000 | Bentley | D8/38 |
| 6,230,389 B1 | * | 5/2001 | Zhu | 29/603.1 |
| D451,774 S | * | 12/2001 | Kelleghan | D8/38 |
| D452,123 S | * | 12/2001 | Kelleghan | D8/38 |
| D453,454 S | * | 2/2002 | Kelleghan | D8/38 |
| D453,455 S | * | 2/2002 | Kelleghan | D8/38 |
| D465,979 S | * | 11/2002 | Vaught | D8/38 |

(Continued)

*Primary Examiner* — Julie Anne Watko
(74) *Attorney, Agent, or Firm* — Mueting, Raasch & Gebhardt, P.A.

(57) ABSTRACT

An apparatus that includes a writer that includes a write pole, at least one return pole, a writer coil and a write pole tip, wherein the write coil wraps around the write pole such that the flow of electrical current through the write coil generates a magnetic flux at the write pole tip, and wherein the write coil has a writer coil shape; and a heater that includes a resistive material, wherein the heater has a heater shape that substantially matches the writer coil shape.

20 Claims, 9 Drawing Sheets

(56) References Cited

U.S. PATENT DOCUMENTS

| | | | |
|---|---|---|---|
| D466,768 S * | 12/2002 | Kelleghan | D8/38 |
| 6,654,202 B2 | 11/2003 | Rea | |
| D488,971 S * | 4/2004 | Kelleghan | D8/38 |
| D488,972 S * | 4/2004 | Kelleghan | D8/38 |
| D488,973 S * | 4/2004 | Kelleghan | D8/38 |
| D495,937 S * | 9/2004 | Kelleghan | D8/38 |
| D500,648 S * | 1/2005 | Kelleghan | D8/38 |
| D504,599 S * | 5/2005 | Kelleghan | D8/38 |
| D505,846 S * | 6/2005 | Toma | D8/38 |
| D511,281 S * | 11/2005 | Purkiss | D8/38 |
| D513,158 S * | 12/2005 | Purkiss | D8/38 |
| 6,975,472 B2 | 12/2005 | Stover | |
| D516,886 S * | 3/2006 | Kelleghan | D8/38 |
| D520,825 S * | 5/2006 | Kelleghan | D8/38 |
| D523,711 S * | 6/2006 | Ryan et al. | D8/34 |
| 7,193,817 B2 * | 3/2007 | Lille | 360/128 |
| D544,767 S * | 6/2007 | Kelleghan et al. | D8/38 |
| D555,996 S * | 11/2007 | Romero | D8/38 |
| D557,576 S * | 12/2007 | Crombie | D8/38 |
| D566,499 S * | 4/2008 | Welch | D8/38 |
| D568,128 S * | 5/2008 | Kelleghan | D8/38 |
| D569,203 S * | 5/2008 | Kelleghan | D8/38 |
| D571,627 S * | 6/2008 | Bouchard | D8/38 |
| 7,403,354 B2 | 7/2008 | Pust | |
| D579,740 S * | 11/2008 | Moman | D8/38 |
| D580,245 S * | 11/2008 | Mazur | D8/38 |
| 7,573,682 B2 | 8/2009 | Pust | |
| 7,593,187 B2 | 9/2009 | Aoki | |
| 7,961,429 B2 * | 6/2011 | Kurihara et al. | 360/125.31 |
| 7,974,046 B2 * | 7/2011 | Ota et al. | 360/294.7 |
| 8,035,922 B2 * | 10/2011 | Lille et al. | 360/123.06 |
| 2004/0257706 A1 * | 12/2004 | Ota et al. | 360/234.5 |
| 2008/0019041 A1 * | 1/2008 | Aoki | 360/110 |
| 2008/0142494 A1 * | 6/2008 | Blake et al. | 219/217 |

* cited by examiner

MAGNETIC DEVICE CONTAINING A HEATER

BACKGROUND

A resistive heater can compensate for or control the effects of various processes that can happen within a magnetic recording head. For example, localized pole tip protrusion can be actuated by a single layer heater element positioned either in close proximity to or inside the magnetic writer to heat the magnetic reader or writer to reduce the head-media spacing (HMS) by affording controlled thermal expansion. As different magnetic recording head designs are utilized, different heater designs can become beneficial.

BRIEF SUMMARY

Disclosed herein is an apparatus that includes a writer that includes a write pole, at least one return pole, a writer coil and a write pole tip, wherein the write coil wraps around the write pole such that the flow of electrical current through the write coil generates a magnetic flux at the write pole tip, and wherein the write coil has a writer coil shape; and a heater that includes a resistive material, wherein the heater has a heater shape that substantially matches the writer coil shape.

Also disclosed is an apparatus that includes a writer that includes a write pole, at least one return pole, a writer coil and a write pole tip, wherein the write coil wraps around the write pole such that the flow of electrical current through the write coil generates a magnetic flux at the write pole tip, and wherein the write coil has a writer coil area; and a heater that includes a resistive material, wherein the heater has a heater area that substantially matches the writer coil area.

Also disclosed is a recording head having a first axis and a second axis orthogonal to the first axis, the recording head including a reader including: a bottom shield, a top shield, and a read element positioned between the bottom shield and the top shield in the first axis; a writer including: a write pole, at least one return pole, a write coil, a write pole tip, and a back portion, wherein the back portion is configured to conduct heat along the write coils towards the write pole tip, wherein the write coil wraps around the write pole such that the flow of electrical current through the write coil generates a magnetic flux at write pole tip, and wherein the write coil has a write coil shape; and a heater including a resistive material, wherein the heater is positioned between the write pole of the writer and the bottom shield of the reader in the first axis, and wherein the heater has a heater shape that includes a bottom notch, wherein the write coil shape and the heater shape are at least partially congruous.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive.

Figure 1A:
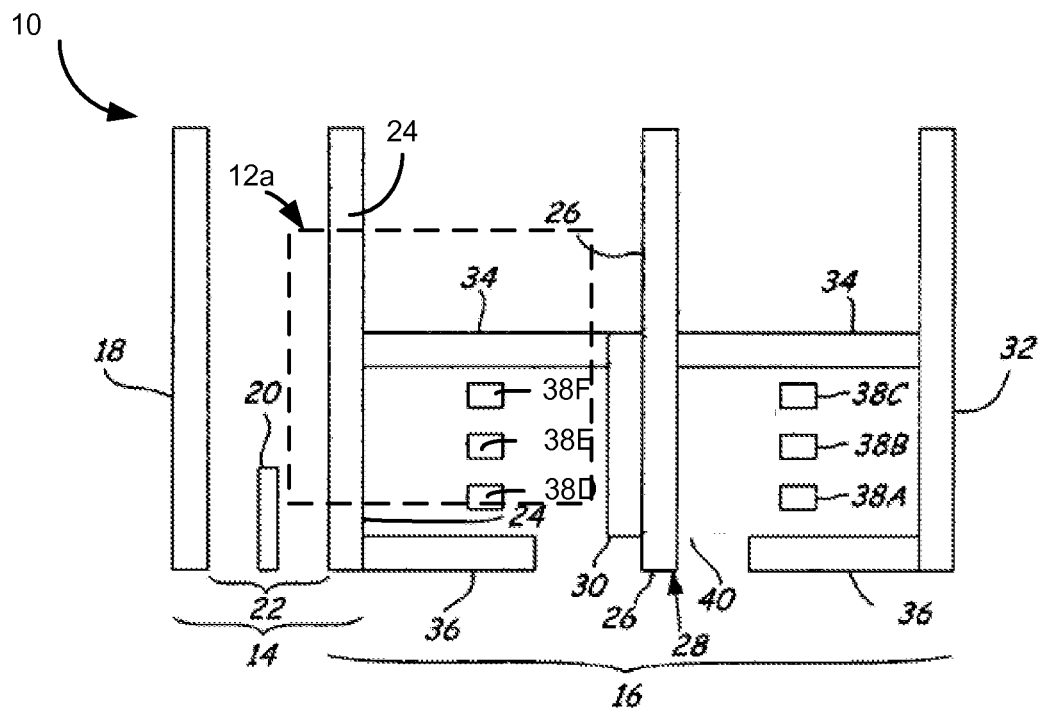
FIG. 1A is a cross-sectional view of a device that shows a general location of a heater as disclosed herein.

FIG. 1A is a sectional view of magnetic head 10 having heater 12 as disclosed herein. Magnetic head 10 generally includes a reader 14 and a writer 16, shown in FIG. 1A in a merged configuration. The reader 14 includes a bottom shield 18, a read element 20, a read gap 22, and a shared pole 24

(which acts as both a top shield and a return pole). The bottom shield 18 is spaced apart from the shared pole 24 by the read gap 22. The bottom shield 18 and the shared pole 24 are formed from metallic materials (in embodiments from an alloy composed primarily of Fe, Ni, and/or Co) that typically have a large CTE. For example, a composition with about 80% Ni-20% Fe or 79% Ni-21% Fe has a CTE in the range of about $10.0 \times 10^{-6}/°C$ to $13.0 \times 10^{-6}/°C$.

The read element 20 is positioned in the read gap 22 between the bottom shield 18 and the shared pole 24 adjacent a storage interface surface of the magnetic head 10. Because magnetic heads disclosed herein can be applicable to industries other than the disc drive industry (i.e. biomedical and automotive), the storage interface surface is generally defined as the surface of the magnetic sensor that interacts with the medium that is able to store data. For instance, an example of a medium in the biomedical industry can include the human body. The read gap 22 is defined on the storage interface surface between terminating ends of the bottom shield 18 and the shared pole 24 and serves to insulate the read element 20 from both the bottom shield 18 and the shared pole 24. In operation, magnetic flux from a surface of a magnetic media causes rotation of a magnetization vector of the read element 20, which in turn causes a change in electrical resistivity of the read element 20. The change in resistivity of read element 20 can be detected by passing a current through read element 20 and measuring a voltage across read element 20. Other magnetic sensing technologies may also be used in the read element. The read element 20 can be any type of read element, such as an anisotropic magnetoresistive (AMR) read element, a giant magnetoresistive (GMR) read element, or a tunneling giant magnetoresistive (TGMR) read element. Read gap 22 is generally formed of an insulating material, such as $Al_2O_3$.

The writer 16 includes a shared pole 24, a write pole 26, a write pole tip 28 located at an end of the write pole 26 at the storage interface surface, a yoke 30, a return pole 32, a back via 34, front shields 36, write coil 38 (shown as upper coil turns 38A, 38B, and 38C and lower coil turns 38D, 38E, and 38F), and an insulator 40. Although magnetic head 10 is shown having two return poles (i.e. shared pole 24 and return pole 32), writer 16 may have only one return pole or no return pole. The shared pole 24, write pole 26, and return pole 32 extend from the storage interface surface and are connected to each other distal from the storage interface surface by a back via 34. In embodiments, a magnetic head 10 may not include a back via 34. The yoke 30 is formed on write pole 26 and is also connected to back via 34, but does not extend the full length of write pole 26. In embodiments, the yoke 30 can be placed on the opposite side of the write pole 26. The front shields 36 are connected to shared pole 24 and return pole 32 adjacent the storage interface surface and extend toward write pole tip 28. In embodiments, the front shields 36 can be eliminated from writer 16. The insulator 40 separates the shared pole 24, the write pole 26, and the return pole 32 from each other and from the write coil 38. It should also be noted that the bottom shield 18, the shared pole 24, the write pole 26, and the return pole 32 need not extend away from the ABS as far as they do in the figures.

The shared pole 24, yoke 30, return pole 32, back via 34, and front shields 36 are formed from metallic ferromagnetic materials. In embodiments, each of these components can be formed from an alloy composed primarily of iron (Fe), nickel (Ni), and/or cobalt (Co) which typically has a large CTE.

As shown in FIG. 1A, write coil 38 has upper coil turns 38A, 38B, and 38C and lower coil turns 38D, 38E, and 38F. Upper coil turns 38A, 38B, and 38C are positioned between write pole 26 and return pole 32, and lower coil turns 38D, 38E, and 38F are positioned between shared pole 24 and write pole 26. Coil turns 38A, 38B, 38C, 38D, 38E, and 38F wrap around write pole 26 such that the flow of electrical current through conductive coil 38 generates a magnetic flux at write pole tip 28. In one configuration, write coil 38 may be wrapped in the following order: 38A to 38D to 38B to 38E to 38C to 38F. Although FIG. 1A shows write coil 38 to be wrapped in a helical configuration, other configurations can also be utilized. Each individual coil section 38A, 38B, 38C, 38D, 38E, and 38F is separated from one another and from shared pole 24, write pole 26, return pole 32, and back via 34 by insulator 40. Write coil 38 is generally formed from an electrically-conductive metal, such as copper (Cu), gold (Au), or silver (Ag). In embodiments, Cu, which has a CTE in the range of about $16.0 \times 10^{-6}/°C$ to $18.0 \times 10^{-6}/°C$ can be utilized for the coil 38.

The insulator 40 surrounds write coil 38 and can be formed from a dielectric material with high thermal conductivity to facilitate the removal of heat from coil 38 via shared pole 24, write pole 26, and return pole 32. In embodiments, insulator 40 can be formed from $Al_2O_3$ or a photoresist having a large CTE.

The heater 12 serves to supply localized heat to writer 16 in order to control the shape of thermal protrusion of writer 16 at the storage interface surface. The heater 12 can generally be formed of a resistive material. In embodiments, the heater can be formed from a highly resistive alloy. In embodiments, the heater 12 can be formed from an alloy composed primarily of chromium (Cr), tungsten (W), or tantalum (Ta).

As seen in FIG. 1A, the heater can generally be positioned anywhere in the area shown by the dashed box 12a, between the read element 20 and the write pole 26. In an embodiment depicted in FIG. 1B, the heater 12 can be positioned between the shared pole 24 and the lower coil turns 38D, 38E, and 38F.

Figure 2:
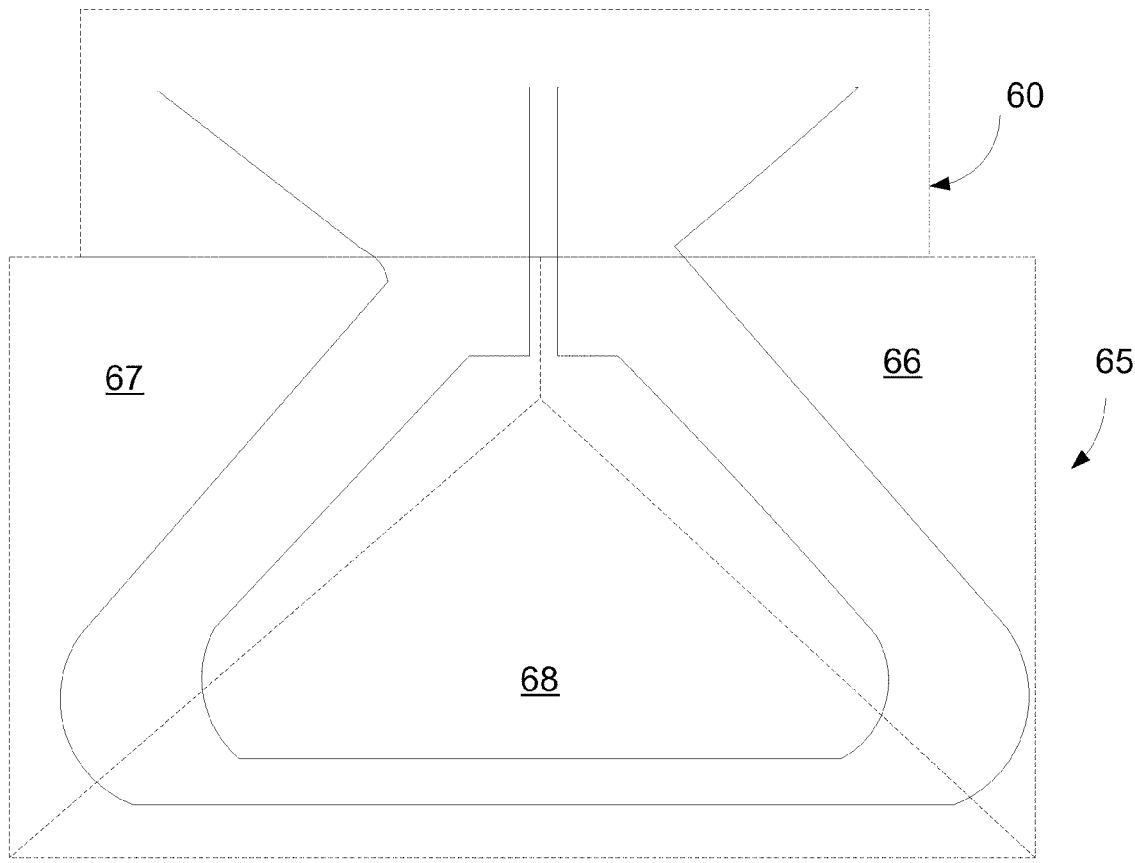
FIG. 2 is a schematic illustration of an exemplary heater as disclosed herein showing the various portions of the exemplary heater.

Heaters as disclosed herein can generally be described as having two major portions: the terminal portion and the heater portion. FIG. 2 depicts an example of a heater 12 that has a terminal portion, shown as generally that part within the box labeled 60 and a heater portion, shown as generally that part within the box labeled 65. The heater portion is the portion that generally functions to transfer heat to the write coil (not shown); and the terminal portion is the portion that generally functions to provide current to the heater portion. In embodiments that include a push block (discussed below), the terminal portion can also dissipate some of the heat that is generated to the push block.

The heater portion 65 of the heater can be considered as having at least three regions. These three regions can be considered a first outer region 66, a second outer region 67, and an inner region 68. The inner region 68 can be characterized as connecting the two outer regions 66 and 67. The heater is configured within the magnetic recording head so that the inner region 68 is closer to the air bearing surface and can be characterized as being generally parallel to the air bearing surface.

Generally, the shape and area of the heater disclosed herein is at least somewhat matched with the shape and area of the write coil. This affords better collection of heat by the write coil which affords better and more controlled expansion of the write coil. It can also enable a larger contact area when the heater is activated. The shape of the heater and write coil can be described in a number of ways. For example, the heater and write coil can be described by their projected areas. A projected area of a write coil can be referred to as a writer coil area. A projected area of a heater can be referred to as a heater area.

A projected area is a two-dimensional area measurement of a three-dimensional object by projecting its shape on to an arbitrary plane. In embodiments, the two-dimensional area measurement of the three-dimensional object can be projected onto a plane that is perpendicular to the air bearing surface (ABS) of the magnetic recording head.

In embodiments, the write coil can be a spirally shaped three dimensional object. In embodiments, the write coil can be lead in in a terminal pattern, spirally wound and then lead out in a terminal pattern. In embodiments, the write coil area can be the projected area of only the spirally wound part of the write coil but not the terminal portions. The write coil can be described by its shape (the writer coil shape) and its area (the writer coil area).

In embodiments, the heater can also be a three dimensional object. In embodiments, the heater can be more easily pictured as a two-dimensional object than can the write coil because it generally is not spirally wound. In such embodiments, the heater does have a thickness that extends it into a third dimension however. The heater can also include a terminal pattern that leads to a resistive portion and then leads out to another terminal pattern. In embodiments, the heater area can be the projected area of only the resistive portion but not the terminal portions (as described in FIG. 2). The heater can be described by its shape (the heater shape) and its area (the heater area).

Figure 1B:
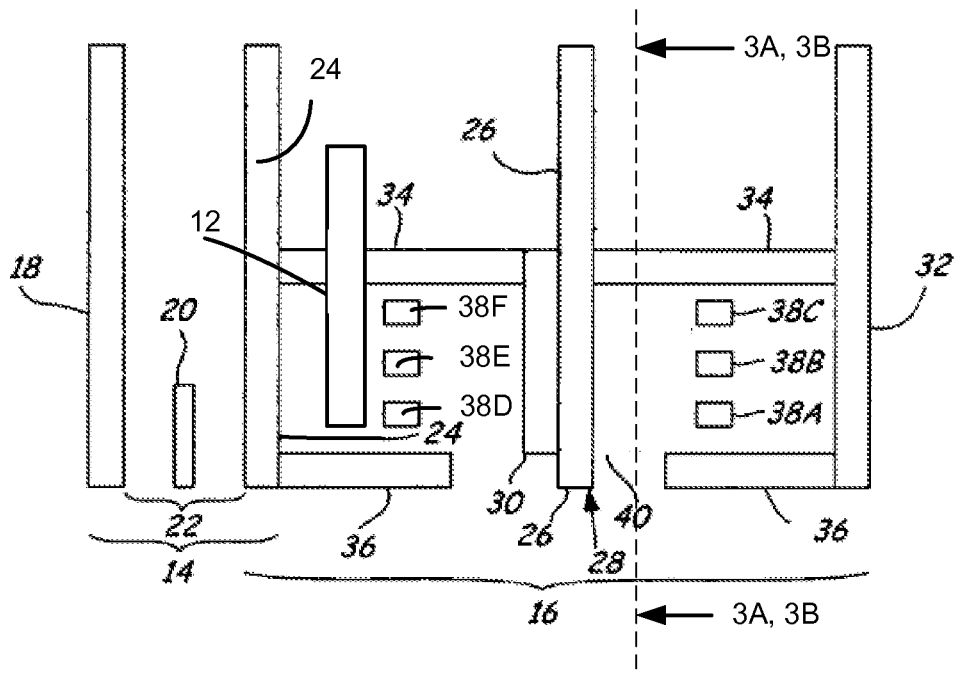
FIG. 1B is a cross-sectional view of a device as disclosed herein that shows an exemplary specific location of a heater as disclosed herein.
Figure 3A:
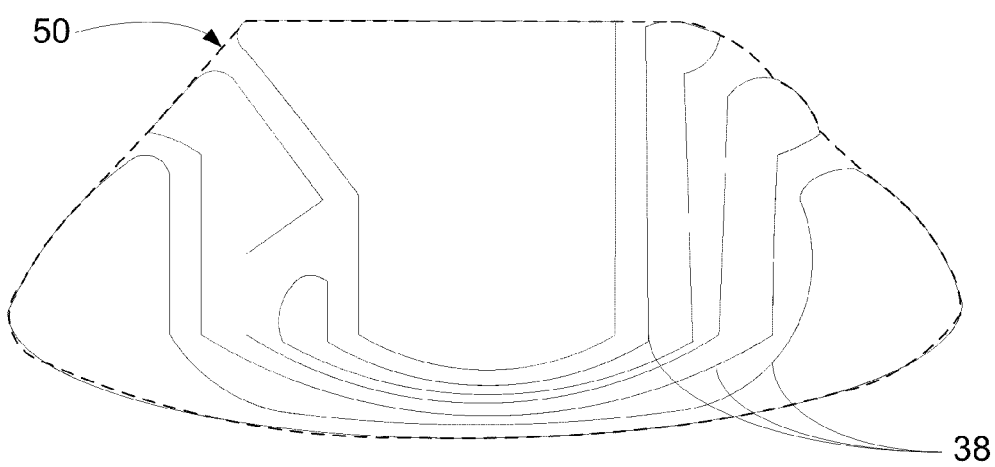
FIG. 3A is a schematic illustration of exemplary writer coils as disclosed herein illustrating a writer coil shape.

FIG. 3A is a top down plan view taken along line A-A of FIG. 1B showing a portion of an exemplary set of write coils 38. It will be understood by one skilled in the art, having read this specification, that the particular configuration of coils represented in FIG. 3A (as well as other figures) are meant only as exemplary coils, and the disclosure provided herein is not meant to be limited to the exemplary coils presented or discussed herein. The dashed line 50 designates the writer coil shape and the area of that shape (or the projected area of the write coil) designates the writer coil area. As seen in this exemplary embodiment, the writer coil shape (designated by the dashed line 50) does not include area that would be the projected area of the terminal portions of the writer coil, but only the spirally wound portions of the writer coil.

Figure 3B:
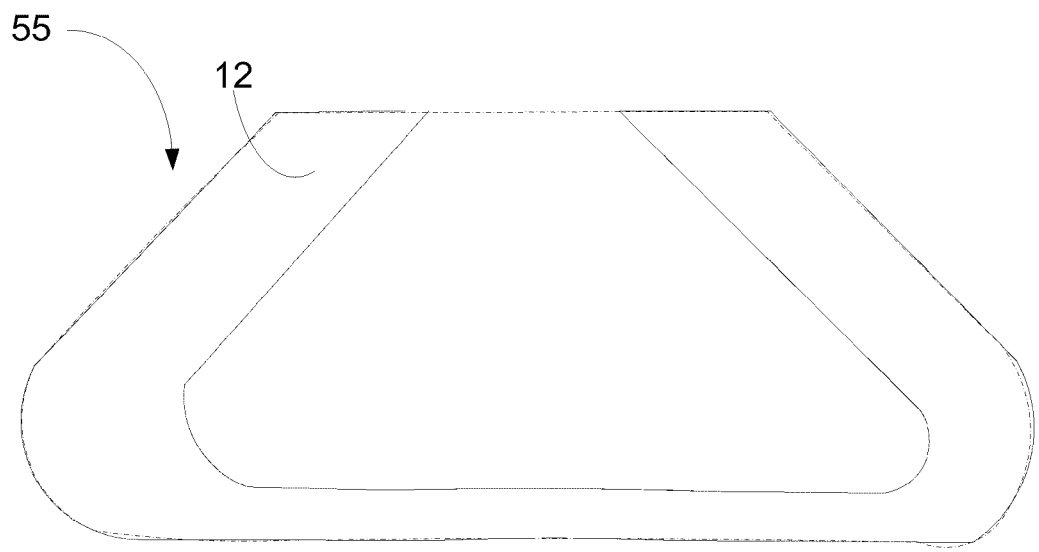
FIG. 3B is a schematic illustration of an exemplary heater as disclosed herein illustrating a heater shape.

FIG. 3B is a top down plan view taken along line A-A of FIG. 1B showing a portion of an exemplary heater 12. It will be understood by one skilled in the art, having read this specification, that the particular configuration of the heater represented in FIG. 3B (as well as other figures) is meant only as an exemplary heater, and the disclosure provided herein is not meant to be limited to the exemplary heaters presented or discussed herein. The dashed line 55 designates the heater shape and the area of that shape (or the projected area of the heater) designates the heater area. As seen in this exemplary embodiment, the heater shape (designated by the dashed line 55) does not include area that would be the projected area of the terminal portions of the heater, but only the resistive portion of the heater.

Figure 3C:
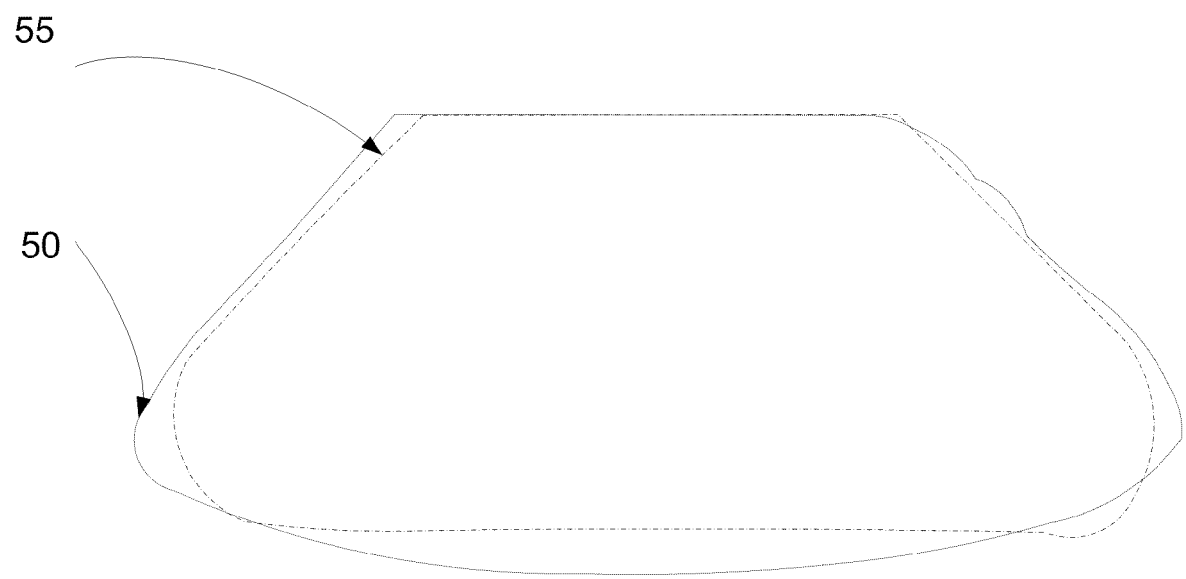
FIG. 3C is a schematic illustration comparing the exemplary writer coil shape and heater shape of FIGS. 3A and 3B.

FIG. 3C shows the exemplary write coil shape 50 and heater shape 55 of the exemplary embodiments depicted in FIGS. 3A and 3B. As seen there, the write coil shape and the heater shape are similar. In embodiments, the shape of the write coil area and the shape of the heater area at least partially overlap. In embodiments, the shape of the write coil area and the shape of the heater area substantially overlap. In embodiments, the write coil shape and the heater shape can substantially match. In embodiments, the writer coil shape and the heater shape can be at least about 80% matching; or can be at least about 90% matching.

The write coil shape 50 and the heater shape 55 shown in FIG. 3C can also be used to determine the writer coil area and the heater area. In embodiments, the writer coil area and the heater area can be similar. In embodiments, the writer coil area and the heater area can be substantially similar. In embodiments, the writer coil area and the heater area can be within about 20% of each other; or within about 10% of each other. In embodiments, the heater area can be somewhat smaller than the write coil area. In embodiments, the heater area can be not greater than about 10% smaller than the write coil area; or can be not greater than about 5% smaller than the write coil area.

In embodiments, the writer coil shape and the heater shape can be similar; and the writer coil area and the heater area can be similar. Such an embodiment can be described as the writer coil and the heater being at least somewhat congruous. In embodiments, the writer coil and the heater (both the writer coil shape and the heater shape; and the writer coil area and the heater area) can be described as being at least about 80% congruous; can be at least about 90% congruous; or can be at least about 95% congruous.

Figure 4A:
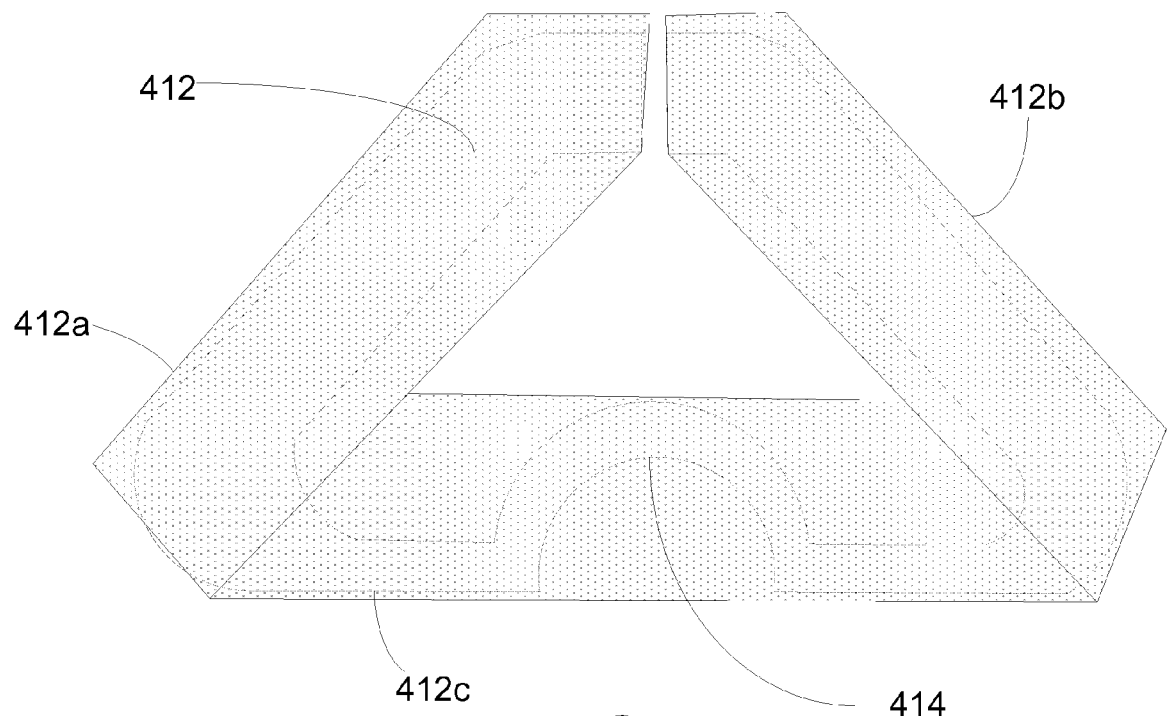
FIG. 4A is a schematic illustration of an exemplary heater having a bottle opener shape as disclosed herein showing the heater shape.

FIG. 4A depicts an exemplary heater 412. The exemplary heater 412 can be described as having a bottle opener shape. The heater 412 has outer portions 412a and 412b and an inner portion 412c. A heater with a bottle opener shape can generally include an inner portion 412c that includes a notched portion, or a notch 414. A notch 414 is generally a portion of the inner portion 412c that is further removed from the air bearing surface than the remainder of the inner portion 412c.

Figure 4B:
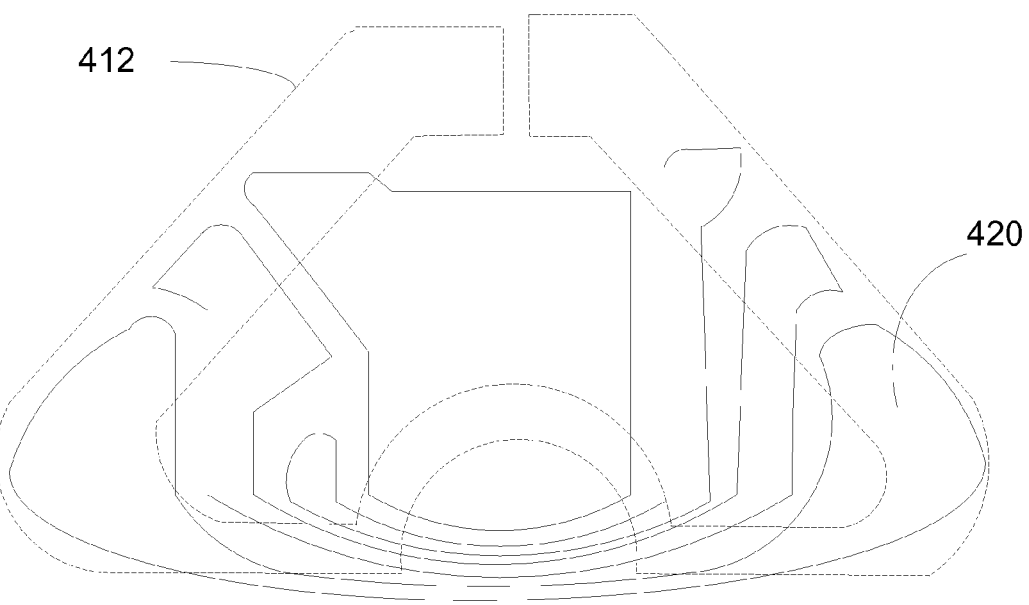
FIG. 4B is a schematic illustration comparing an exemplary writer coil shape and heater shape.

FIG. 4B depicts an exemplary write coil that could be utilized with the exemplary heater 412 shown in FIG. 4A (it is also depicted in FIG. 4B). As seen there, the heater 412 and the writer coil 420 are at least substantially similar; in that the writer coil shape can be similar to the heater shape, the writer coil area can be similar to the heater area, or both. A heater with a bottle opener shape in combination with a similar writer coil (similar shapes, area, or both) can be advantageous for a number of reasons. For example, it can enable a short writer core transducer by placing the heater outside the writer core rather than within the coil turns, it can maintain the write pole as the close point to the air bearing surface by conducting heat up to the write pole by way of the writer coils, it can generate large contact area for acceptable contact detection, it can improve the reader-writer protrusion ratio, it can improve the stroke efficiency of the heater, it can minimize reader heating by not passing over the reader, it can minimize hot spots in the heater to enhance the expected life of the heater, enable perpendicular magnetic recording (PMR) head with the heater below the coil, or a combination thereof.

Figure 4C:
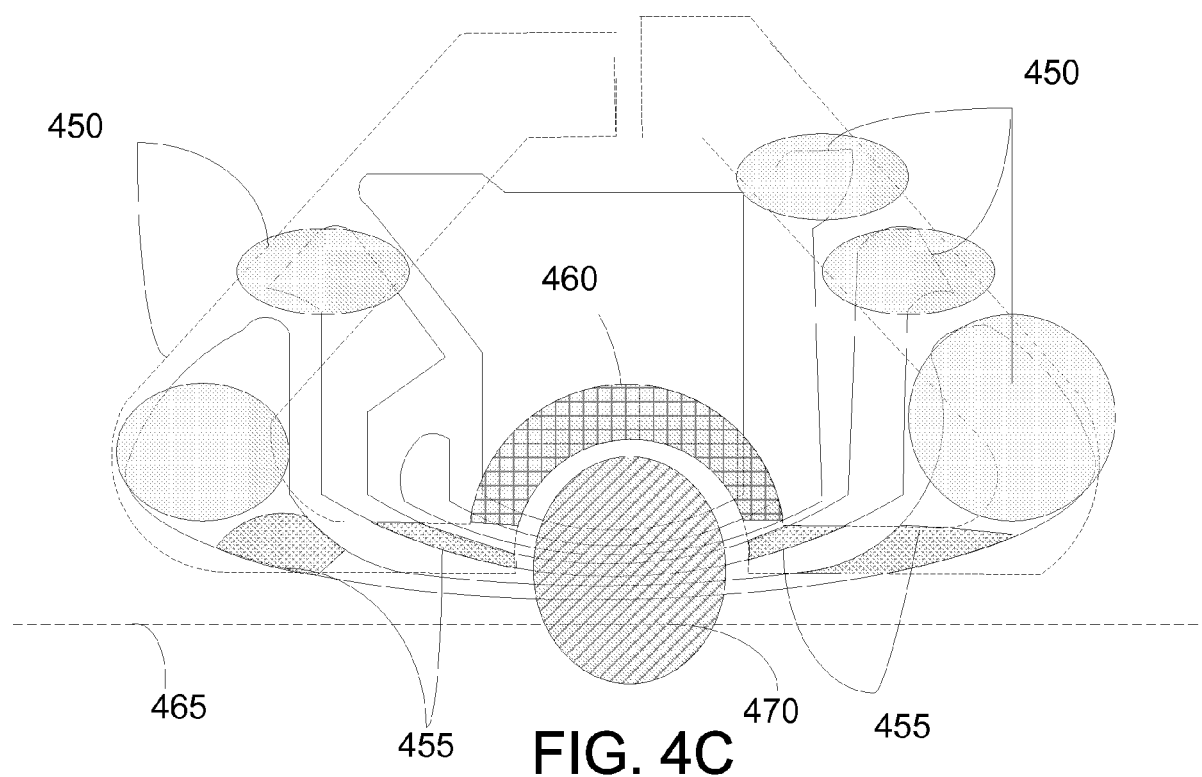
FIG. 4C is a schematic illustration showing different regions of overlap of an exemplary writer coil shape and heater shape.

FIG. 4C can also be reviewed to show other optional considerations that can be included in the design of the heater and/or writer coil. In embodiments, the inner and outer left and right regions can have significant overlapping areas in common with the writer coil vias for efficient heat transfer (these areas are noted as the regions 450); the inner left and right regions can have significant overlapping areas in common with the transverse running writer coils (these areas are noted as the speckled regions 455), but the regions are not too far or too close to the ABS—noted as the dashed line 465; the outer central region circumnavigates the reader element and the writer pole tip (which generally exists in the region 470), to prevent or minimize excessive reader heating and prevent or minimize an overly pointy protrusion near the writer pole tip (this area is noted as the dashed region 460); or the heater and writer coil can have combinations thereof.

Figure 5:
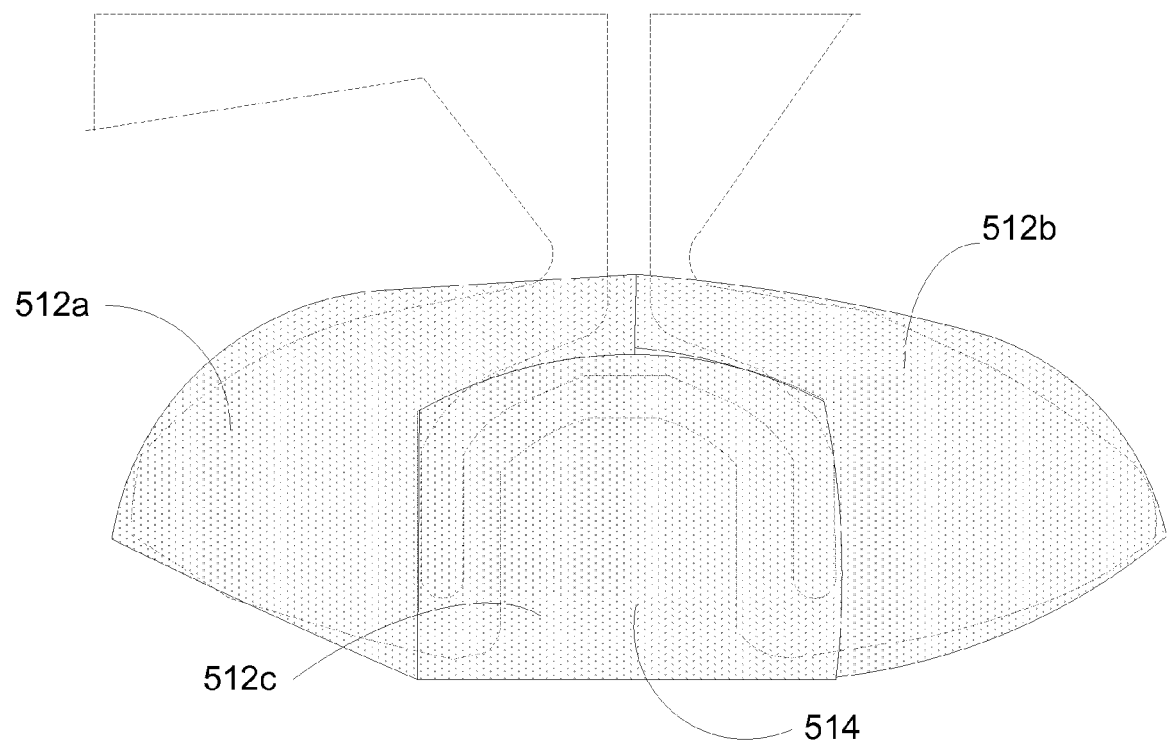
FIG. 5 is a schematic illustration of an exemplary heater having a moth shape as disclosed herein showing the heater shape.

FIG. 5 depicts another exemplary heater 512. The exemplary heater 512 can be described as having a moth shape. The heater 512 has outer portions 512a and 512b and an inner portion 512c. A heater with a moth shape can generally include an inner portion 512c that includes a notched portion 514. A heater with a moth shape can generally include outer portions 512a and 512b that are substantially wider (in a dimension that is orthogonal to the air bearing surface) than the inner portions. This generally means that the outer portions (or an outer portion) have a lower electrical resistance and therefore less localized heat generation than the inner portion as a result of the wider feature. More resistive material in the outer portions can allow the heat to be collected and then conducted towards the center where contact with the storage medium is meant to occur.

Figure 6A:
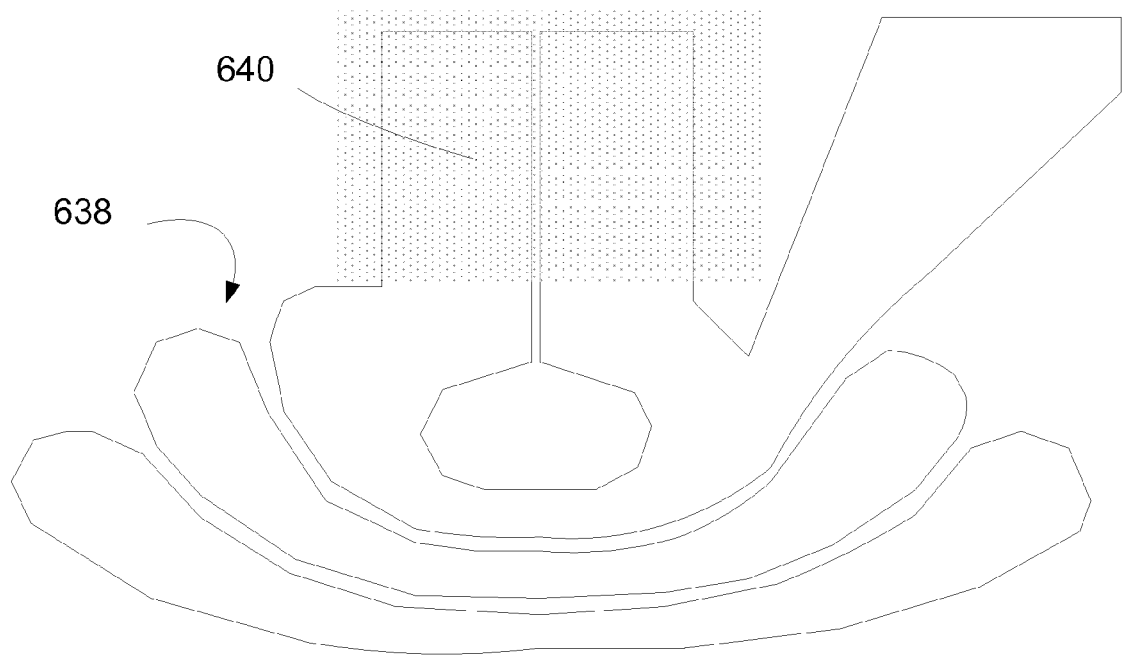
FIG. 6A is a schematic illustration of an exemplary writer coil that includes a back portion.
Figure 6B:
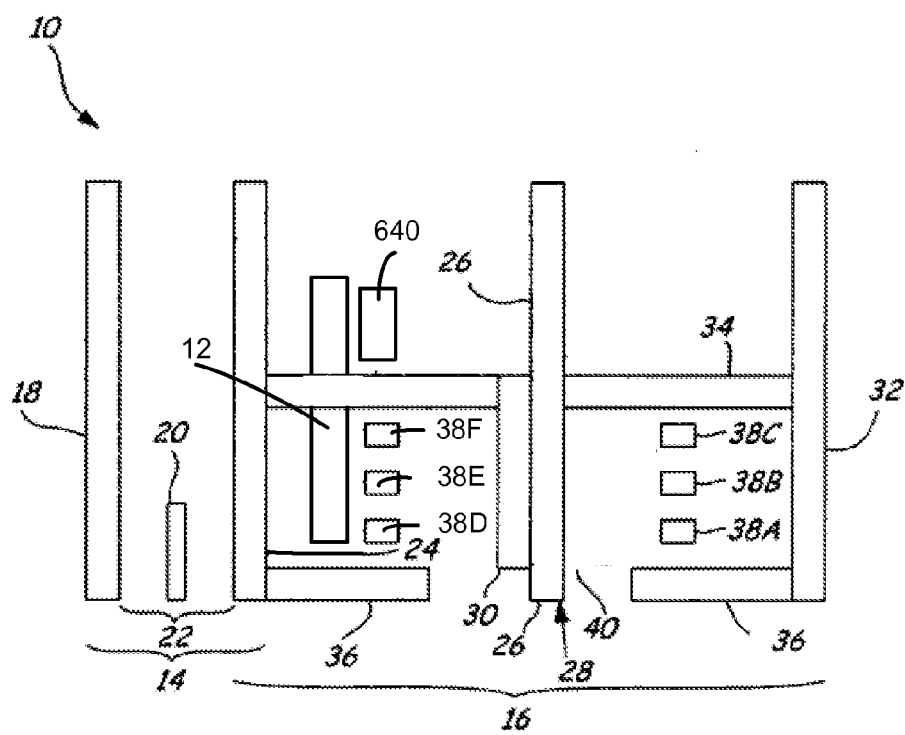
FIG. 6B is a cross-sectional view of an exemplary device that includes a back portion of a writer coil as disclosed herein.

FIG. 6A depicts an exemplary write coil 638 that can include an optional back portion 640. The back portion 640, which can also be referred to as a push block can function to conduct heat along the write coils towards the write pole tip. Heat conducted along the write coils towards the write pole tip can cause the back portion to thermally expand in size along its long axis, which can also assist in pushing the magnetic head towards the ABS. This material, which can generally be made of the same materials as the writer coil itself can function to collect heat which would otherwise be wasted but instead conduct it towards the air bearing surface such that heater stroke efficiency can be improved. FIG. 6B shows the back portion 640 in a sectional view of the magnetic head 10. The back portion can be placed relatively close to the heater 12 in order to collect heat more efficiently. One method of doing this is to extend the material of the write coil behind the core.

In embodiments, the back portion can also be similar to the shape of a back portion (or terminal portion) of the heater. An example of such similarity can be seen by comparing the terminal portion of the heater 512 in FIG. 5 with the back portion 640 of the writer coil 638 in FIG. 6A. As seen upon comparing those two structures, they have shapes which could be considered at least similar. If the back portion of the writer coil is too small, it doesn't collect much heat, and there are fewer atoms to expand along the long axis of the back portion (i.e., towards the air bearing surface). If the back portion of the writer coil is too large relative to the heater, then it simply functions as a radiator (collecting and dissipating heat) thereby making the stroke efficiency of the heater suffer.

In embodiments, the material of the back portion of the writer coil can be as close as possible to the rear of the core (for example as close as possible to the via 34). This can help to move other metallic parts within the recording head as well. In embodiments, the back portion of the write coil is as close as possible to the via 34 without causing the writer coil to be electrically connected to the core. This can be accomplished by either separating the core and the coils with a dielectric material or by modifying the geometry of the back portion of the writer coils so that there is a break in the electrical circuit elsewhere.

Embodiments that include similar write coil area and heater areas can allow effective thermal transfer from the heater to the write coils. This can afford a large contact area (of the air bearing surface of the magnetic recording head and the medium) when the heater is activated. In embodiments, the heater and the writer coil are configured so that there is one single close region of the device (or recording head) to the air bearing surface. The close region or close point of the device can generally be characterized as the most protruded region of the device (recording head or transducer) to the air bearing surface of the device. In embodiments, the heater and the writer coil are configured so that there is one single close region of the device (or recording head) to the air bearing surface instead of having two regions on either side of the writer that are close regions of the device to the air bearing surface. In embodiments, the close region of the device is in the cross-track direction centered on the write pole.

In embodiments, the writer coil and heater are configured such that the ratio of the writer protrusion to the reader protrusion is not greater than a certain amount when the heater is activated. In embodiments, the writer coil and heater are configured such that the ratio of the writer protrusion to the reader protrusion is not greater than about 1.2. In embodiments, the writer coil and heater are configured such that the ratio of the writer protrusion to the reader protrusion is not less than 1.0 while still preventing the reader from being harmed. In embodiments, the writer coil and heater are configured such that the ratio of the writer protrusion to the reader protrusion is not greater than about 1.2 while still maintaining the close point or close region of the device to the air bearing surface at or near the write pole.

In embodiments, the writer coil and heater are configured such that the heater stroke efficiency of the heater is relatively high. Generally, the heater stroke efficiency is the protrusion that is obtained per power input into the heater. Generally, the stroke efficiency can be limited by the temperature rise of the reader, heater, air bearing surface, or combinations thereof; exceeding the maximum preamp power setting (compliance) of the heater; or combinations thereof. In embodiments, the stroke efficiency of a disclosed heater in units of nm/mW (for example) does not exceed the compliance limit of the preamp. In embodiments, the stroke efficiency of a disclosed heater in units of nm/° C. does not exceed the life limits of the reader, heater, or air bearing surface passivation layer.

In embodiments, the writer coil and heater are configured such that the device (for example the recording head) has a contact area that is large enough that it can be reliably detected. If the contact area is too small contact can be detected "late" on some parts, which can cause those parts to fly lower than the rest of the device and be more at risk of reliability failure. If the contact area is too large the efficiency can suffer, plus there may be a high likelihood of having a device that doesn't fly well on a disc.

In embodiments, a device having a heater and a writer coil that are configured to have similar shapes and areas, and a back portion of a writer coil configured to conduct heat along the write coils towards the write pole tip can be advantageous. For example, such a device can be advantageous because it can provide an efficient heater having sufficient contact area that allows the device to reach the air bearing surface without suffering bit/byte error rate (BER) increases, reaching the maximum heater power supplied by the preamp, shorting the heater, causing physical damage to the heater, the reader, or the air bearing surface passivation layer, or some combination thereof.

EXAMPLES

Figure 7A:
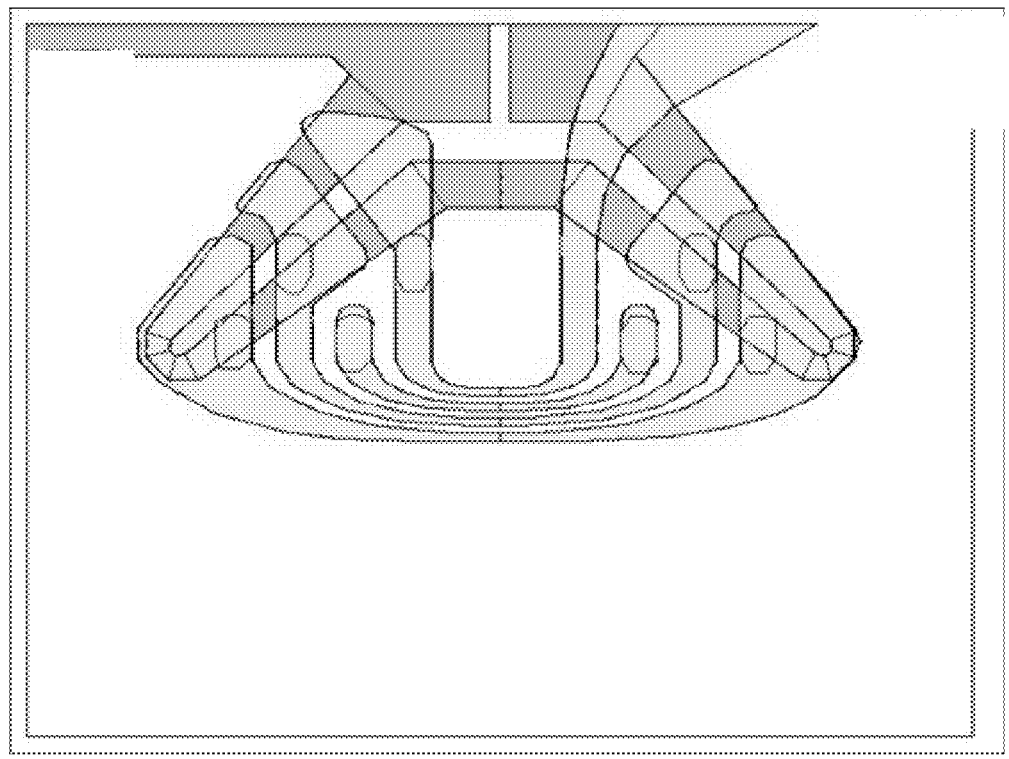
FIGS. 7A through 7F depict information used in and information obtained in modeling experiments.
Figure 7B:
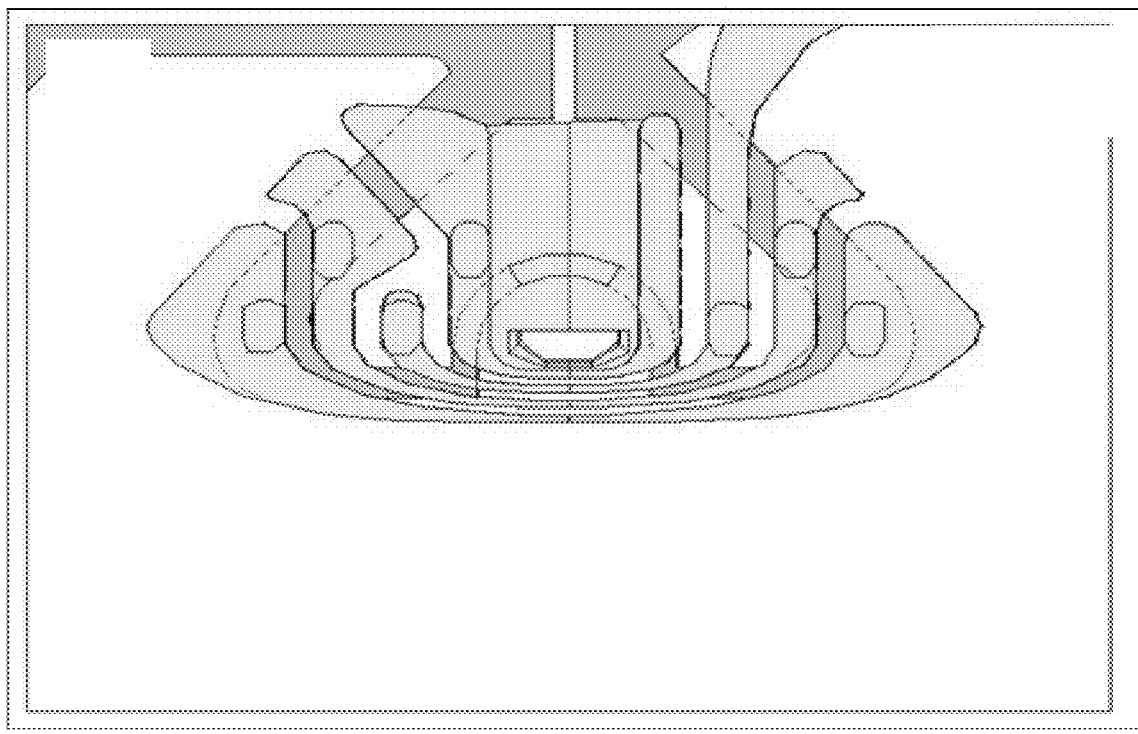

Thermo-mechanical modeling was performed on several designs to confirm and quantify benefits of utilizing disclosed magnetic recording heads. For example, a heater shaped like a boomerang (see FIG. 7A) was compared to the bottle opener design discussed above (see FIG. 7B). Modeling showed that the bottle opener design was superior, even though they have several elements in common.

Figure 7C:
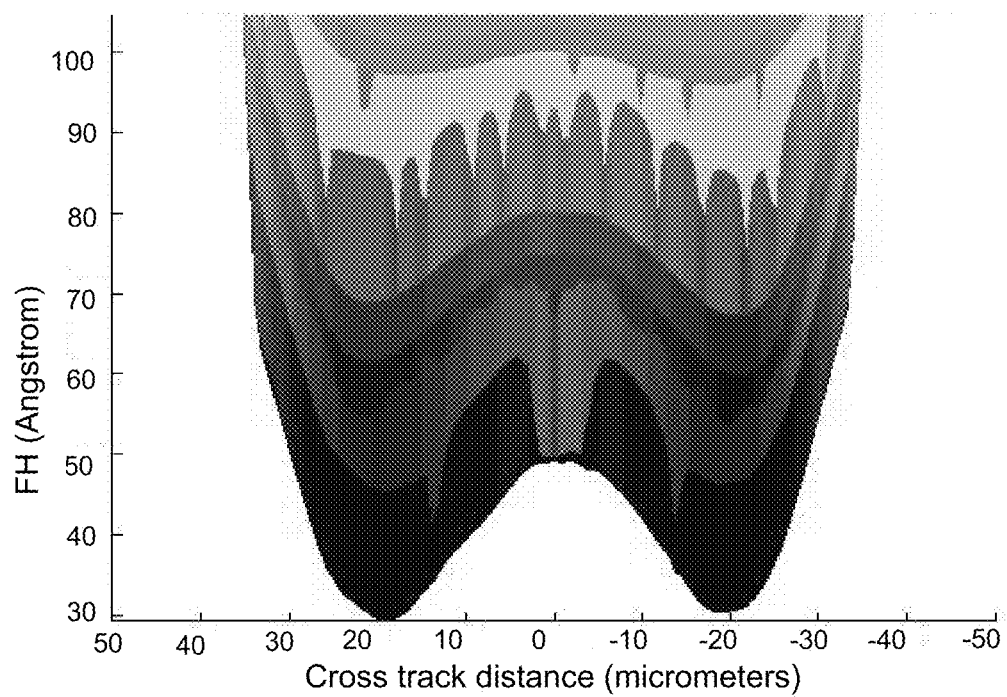
Figure 7D:
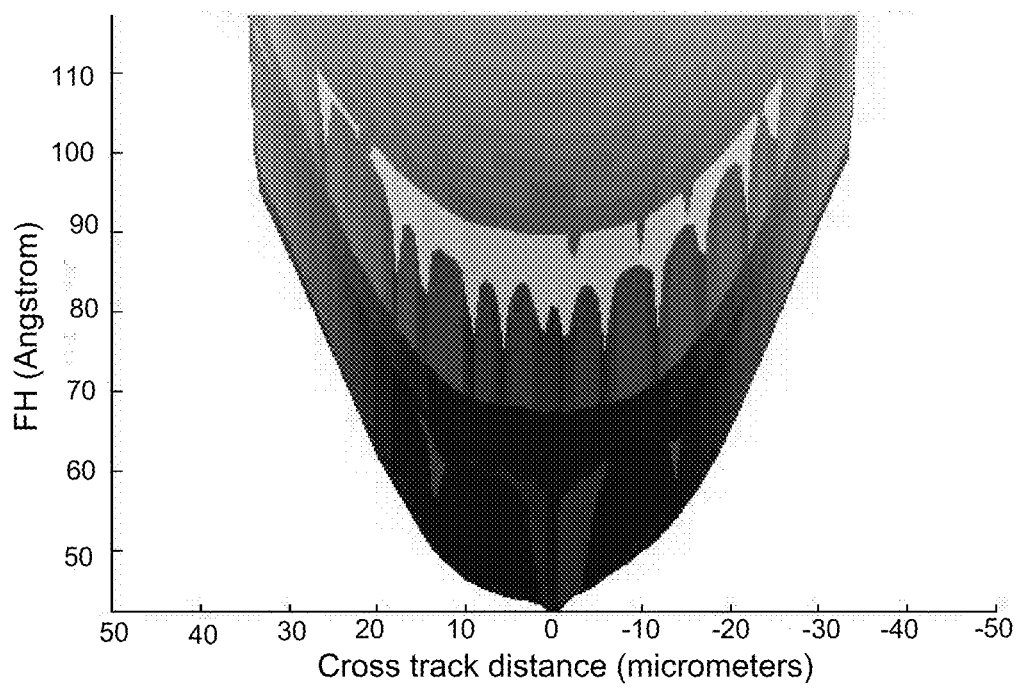
Figure 7E:
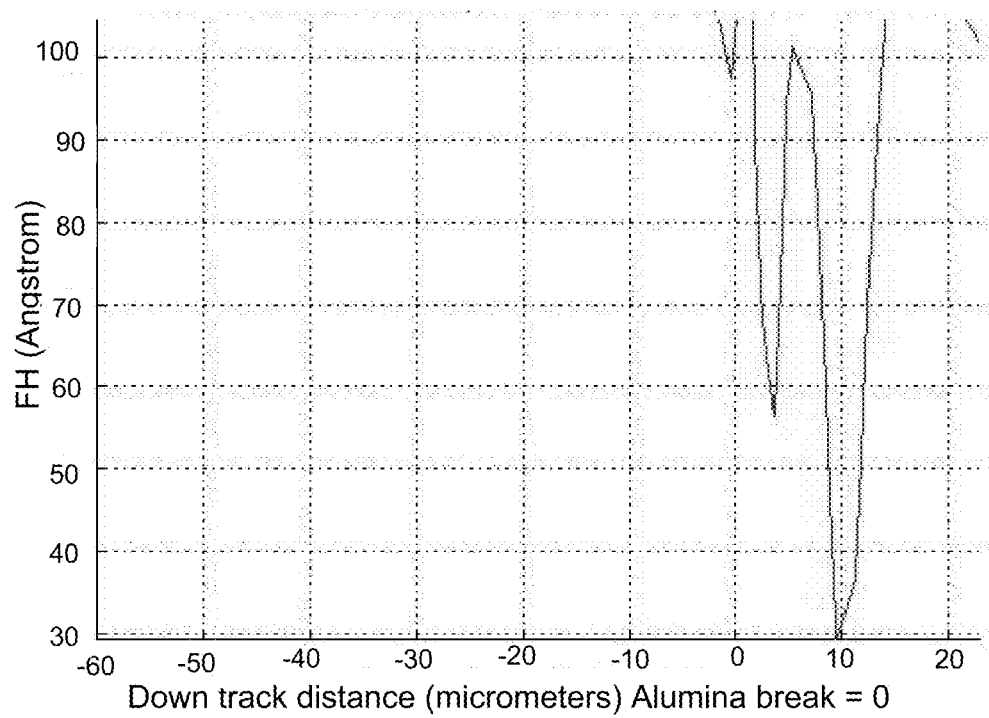
Figure 7F:
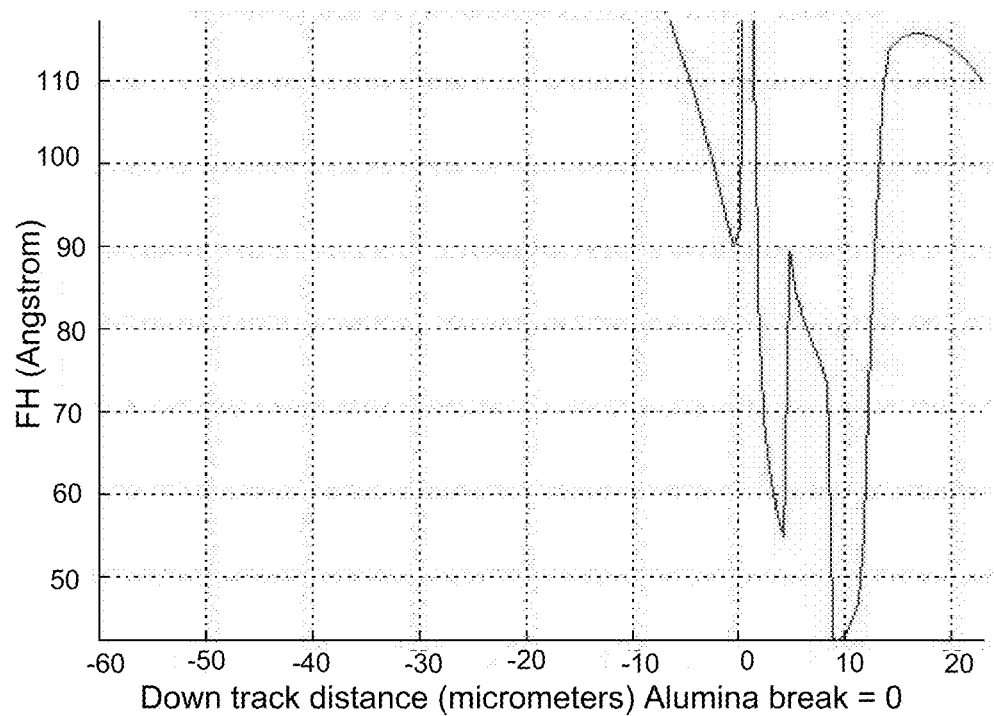

FIGS. 7C and 7D show exaggerated views looking down track along the ABS showing the protrusion profile in the cross-track direction for the boomerang heater (FIG. 7C) and the bottle opener (FIG. 7D). This figure shows that the boomerang has two lobes while the bottle opener has a singular, wide lobe. FIGS. 7E and 7F show exaggerated views looking in the cross-track direction along the ABS showing the protrusion profile in the down-track direction for the boomerang heater (FIG. 7E) and the bottle opener heater (FIG. 7F). As seen there, both designs have the close point at the writer, but the reader is much closer to the disc in the bottle opener heater such that read HMS is improved and BER also improves.

As seen from the modeling, the boomerang heater results in two contact points off to the sides of the write point such that HMS is not improved, and in some cases can actually worsen. Furthermore, the stroke efficiency is low such that heater and reader life are poor even if the transducer could be actuated enough to reach the disc surface; As a result, BER is poor. In contrast, the Bottle opener heater creates a relatively wide and singular contact point near the write pole having sufficient stroke efficiency to reach the disc and sustain the heater and reader life.

Thus, embodiments of MAGNETIC DEVICES CONTAINING A HEATER are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present disclosure is limited only by the claims that follow.

What is claimed is:

1. An apparatus comprising:
a writer that comprises a write pole, at least one return pole, a writer coil and a write pole tip, wherein the write coil wraps around the write pole such that the flow of electrical current through the write coil generates a magnetic flux at the write pole tip, and wherein the write coil has a writer coil shape and a write coil area; and
a heater that comprises a resistive material, wherein the heater has a heater shape and a heater area, and
wherein the writer coil area and the heater area are within about 20% of each other, and
wherein the write coil further comprises a back portion that is configured to conduct heat alone the write coils towards the write pole tip.

2. The apparatus according to claim 1, wherein the heater shape is a bottle opener shape.

3. The apparatus according to claim 1, wherein the heater shape is a moth shape.

4. The apparatus according to claim 1, wherein the heater shape further comprises a bottom notch.

5. The apparatus according to claim 1 further comprising a reader that comprises a bottom shield, a top shield, and a read element positioned between the bottom shield and the top shield, and wherein the heater is positioned between the write pole of the writer and the bottom shield of the reader.

6. The apparatus according to claim 1, wherein the heater comprises two outer portions and an inner portion, wherein the inner portion connects the two outer portions, and the two outer portions are substantially wider than the inner portions.

7. The apparatus according to claim 1, wherein the writer coil area and the heater area are within about 10% of each other.

8. The apparatus according to claim 1, wherein the writer coil area and the heater area are within about 5% of each other.

9. The apparatus according to claim 1, wherein the back portion comprises the same material as the write coil.

10. An apparatus comprising:
a writer that comprises a write pole, at least one return pole, a writer coil and a write pole tip, wherein the write coil wraps around the write pole such that the flow of electrical current through the write coil generates a magnetic flux at the write pole tip, and wherein the write coil has a writer coil area; and
a heater that comprises a resistive material, wherein the heater has a heater area, and the writer coil area and the heater area are within about 20% of each other, and
wherein the write coil further comprises a back portion that is configured to conduct heat alone the write coils towards the write pole tip.

11. The apparatus according to claim 10, wherein the writer coil area and the heater area are within about 10% of each other.

12. The apparatus according to claim 10, wherein the heater area is about 5% smaller than the writer coil area.

13. The apparatus according to claim 10 further comprising a reader that comprises a bottom shield, a top shield, and a read element positioned between the bottom shield and the top shield, and wherein the heater is positioned between the write pole of the writer and the bottom shield of the reader.

14. The apparatus according to claim 10, wherein the heater comprises two outer portions and an inner portion, wherein the inner portion connects the two outer portions, and the two outer portions are substantially wider than the inner portions.

15. The apparatus according to claim 10, wherein the writer coil also has a writer coil shape and the heater also has a heater shape and the writer coil shape and the heater shape are at least somewhat congruous.

16. The apparatus according to claim 10, wherein the back portion comprises the same material as the write coil.

17. A recording head having a first axis and a second axis orthogonal to the first axis, the recording head comprising:
a reader comprising: a bottom shield, a top shield, and a read element positioned between the bottom shield and the top shield in the first axis;
a writer comprising: a write pole, at least one return pole, a write coil, a write pole tip, and a back portion, wherein the back portion is configured to conduct heat along the write coils towards the write pole tip, wherein the write coil wraps around the write pole such that the flow of electrical current through the write coil generates a magnetic flux at write pole tip, and wherein the write coil has a write coil shape and a writer coil area; and
a heater comprising a resistive material, wherein the heater is positioned between the write pole of the writer and the bottom shield of the reader in the first axis, and wherein the heater has a heater shape that includes a bottom notch and a heater area,
wherein the write coil area and the heater area are within about 20% of each other, and
wherein the write coil further comprises a back portion that is configured to conduct heat alone the write coils towards the write pole tip.

18. The recording head according to claim 17, wherein the heater shape is a bottle opener shape.

19. The recording head according to claim 17, wherein the heater shape is a moth shape.

20. The recording head according to claim 17, wherein the back portion comprises the same material as the write coil.

* * * * *